(12) United States Patent
Barton et al.

(10) Patent No.: US 7,240,171 B2
(45) Date of Patent: Jul. 3, 2007

(54) METHOD AND SYSTEM FOR ENSURING CONSISTENCY OF A GROUP

(75) Inventors: Edward M. Barton, Pleasanton, CA (US); Avishai H. Hochberg, San Jose, CA (US); James P. Smith, Redwood City, CA (US); Peter B. Symonds, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 10/764,069

(22) Filed: Jan. 23, 2004

(65) Prior Publication Data

US 2005/0165867 A1    Jul. 28, 2005

(51) Int. Cl.
*G06F 12/00*    (2006.01)
(52) U.S. Cl. .................. 711/161; 711/162; 707/204
(58) Field of Classification Search ........ 711/161–162; 707/204
See application file for complete search history.

(56) References Cited

U.S. PATENT DOCUMENTS

| | | | |
|---|---|---|---|
| 5,608,865 A | 3/1997 | Midgely et al. | |
| 6,038,639 A | 3/2000 | O'Brien et al. | |
| 6,421,767 B1 | 7/2002 | Mililo et al. | |
| 6,460,054 B1 * | 10/2002 | Grummon | 707/204 |
| 6,910,112 B2 * | 6/2005 | Berkowitz et al. | 711/162 |
| 2003/0182325 A1 * | 9/2003 | Manley et al. | 707/204 |
| 2003/0196052 A1 | 10/2003 | Bolik et al. | |
| 2005/0071388 A1 * | 3/2005 | Fienblit et al. | 707/204 |

* cited by examiner

*Primary Examiner*—Pierre Bataille
*Assistant Examiner*—Hetul Patel
(74) *Attorney, Agent, or Firm*—Timothy N. Ellis

(57) ABSTRACT

One aspect of the invention is a method for ensuring consistency of a group, which for example, includes receiving a first list that identifies objects in the group, and gathering for at least one attribute, the value of the attribute for each object in the first list. The first list, and the attribute values gathered in the gathering operation, are stored to create a first snapshot. This example also includes receiving a second list that identifies objects that are in the group after at least part of a task is performed, and the value after at least part of the task is performed of the at least one attribute for each object identified in the second list. The second list and the received attribute values are stored to create a second snapshot, which is compared with the first snapshot.

30 Claims, 3 Drawing Sheets

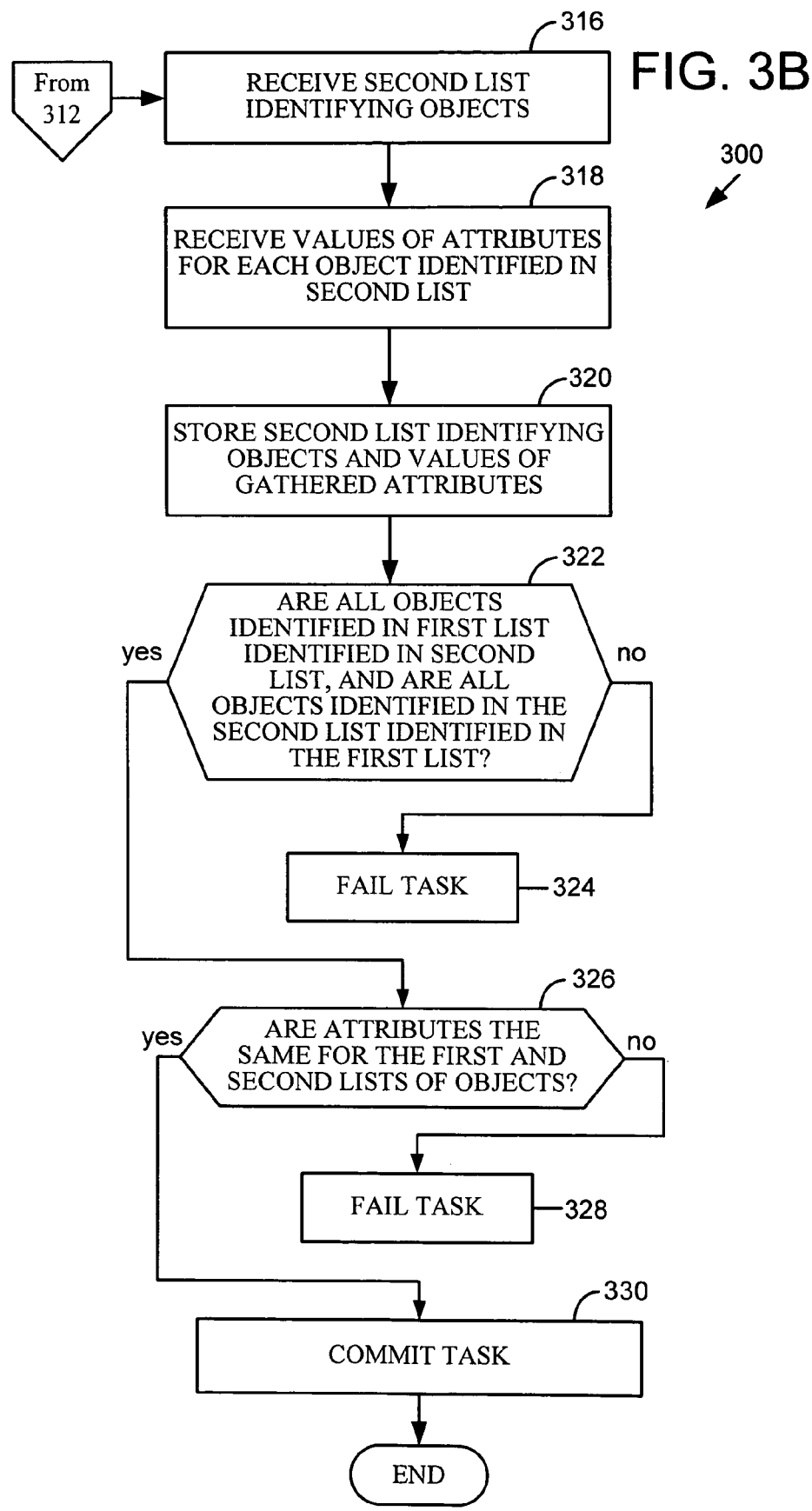

METHOD AND SYSTEM FOR ENSURING CONSISTENCY OF A GROUP

BACKGROUND

1. Technical Field

The present invention relates to ensuring consistency of a group of objects in a computing system. More particularly, the invention concerns ensuring consistency of a group of objects in a computing system during a period of time.

2. Description of Related Art

In modern computing systems, information is often backed up, archived, or migrated. As an example, information, such as data objects, may be backed up, archived, or migrated from client nodes in a computer network. A storage-management software application, such as Thiol Storage Manager (TM), which is available from International Business Machines Corporation, may provide a repository for the information that is backed up, archived, or migrated. Additionally, a storage-management server may be used to store data objects in one or more storage repositories, and may have a database for tracking information about the stored files.

Groups of objects (which, for example may be files) may be backed up, archived, migrated, or manipulated as a single logical entity (also called a logical group). For example, a group of objects may comprise a logical entity, such as a Database, at a time to (beginning of backup). This logical group may be defined as a point-in-time view of the objects in the group at the time t1. Because it takes a period of time to back up all of the objects in a logical group, the logical group may become inconsistent before the backup is completed at a time t2 (end of backup). The group may become inconsistent due to changes in values of attributes of existing members of the group, or due to adding or deleting members of the group, in comparison with the point-in-time view of the group at time t1.

When information is backed up, archived, or migrated, consistency of a logical group must be maintained over a time period between the time that the members of the group are defined, and the time the group is stored on the backup storage. If the logical group becomes inconsistent during that time period, the logical group becomes invalid. For example, for backups of data files used by application servers such as WebSphere (available from International Business Machines Corporation), and for database application logical group backups, if the data and/or files in a group change during a backup, then the group becomes inconsistent, and an application dependant on the data may not function correctly.

A limited number of file systems include an agent or service, such as the Tivoli Logical Volume Snapshot Agent available from International Business Machines Corporation, or the Volume Shadow Services available from Microsoft Corporation, which have the ability to take "point-in-time" snapshots of all of the files in a file system, and which could be utilized when determining consistency of files. However, this snapshot capability is not widely available, and has limited usefulness because it cannot be used to obtain a snapshot of only a subset of files in a filesystem, and because it cannot be used with non-file data (for example, raw data).

Known techniques for performing backups must rely on application programs (for example, database applications) to guarantee data consistency. This application specific approach is generally inefficient because it is very specific and requires in depth knowledge of the way the application operates, and because it also requires an interface to the application. Additionally, known techniques are only able to ensure consistency of a single file. Consequently, known techniques are inadequate for ensuring that values of attributes of existing members of a logical group have not changed, or for ensuring that members of the logical group have not been added or deleted, during a time period of interest, for example, during the time required to perform a data backup.

SUMMARY

One aspect of the invention is a method for ensuring consistency of a group of data objects. An example of the method includes receiving a first list that identifies objects in the group. This example also includes gathering, for at least one attribute, the value of the attribute for each object identified in the first list. This example further includes storing the first list that identifies objects, and the attribute values gathered in the gathering operation, to create a first snapshot of the first list that identifies objects and the gathered attribute values. Additionally, this example includes receiving, a second list that identifies objects that are in the group after at least part of a task (for example, performing a backup) is performed, and the value after at least part of the task is performed of the at least one attribute for each object identified in the second list. This example further includes storing the second list that identifies objects, and the received attribute values, to create a second snapshot of the second list that identifies objects and the received attribute values. Additionally, this example also includes comparing the first snapshot with the second snapshot.

Other aspects of the invention are described in the sections below, and include, for example, a computing system, and a signal bearing medium tangibly embodying a program of machine-readable instructions executable by a digital processing apparatus to perform a method for ensuring consistency of a group of data objects.

Some examples of the invention advantageously provide a simple, general purpose technique that is not application dependent, for guaranteeing data consistency for a logical group over a period of time (for example, across a backup window). Some examples of the invention also provide a number of other advantages and benefits, which should be apparent from the following description.

BRIEF DESCRIPTION OF THE DRAWINGS

FIGS. 3A and 3B are a flowchart of an operational sequence for ensuring consistency of a group in accordance with an example of the invention.

DETAILED DESCRIPTION

Figure 1:
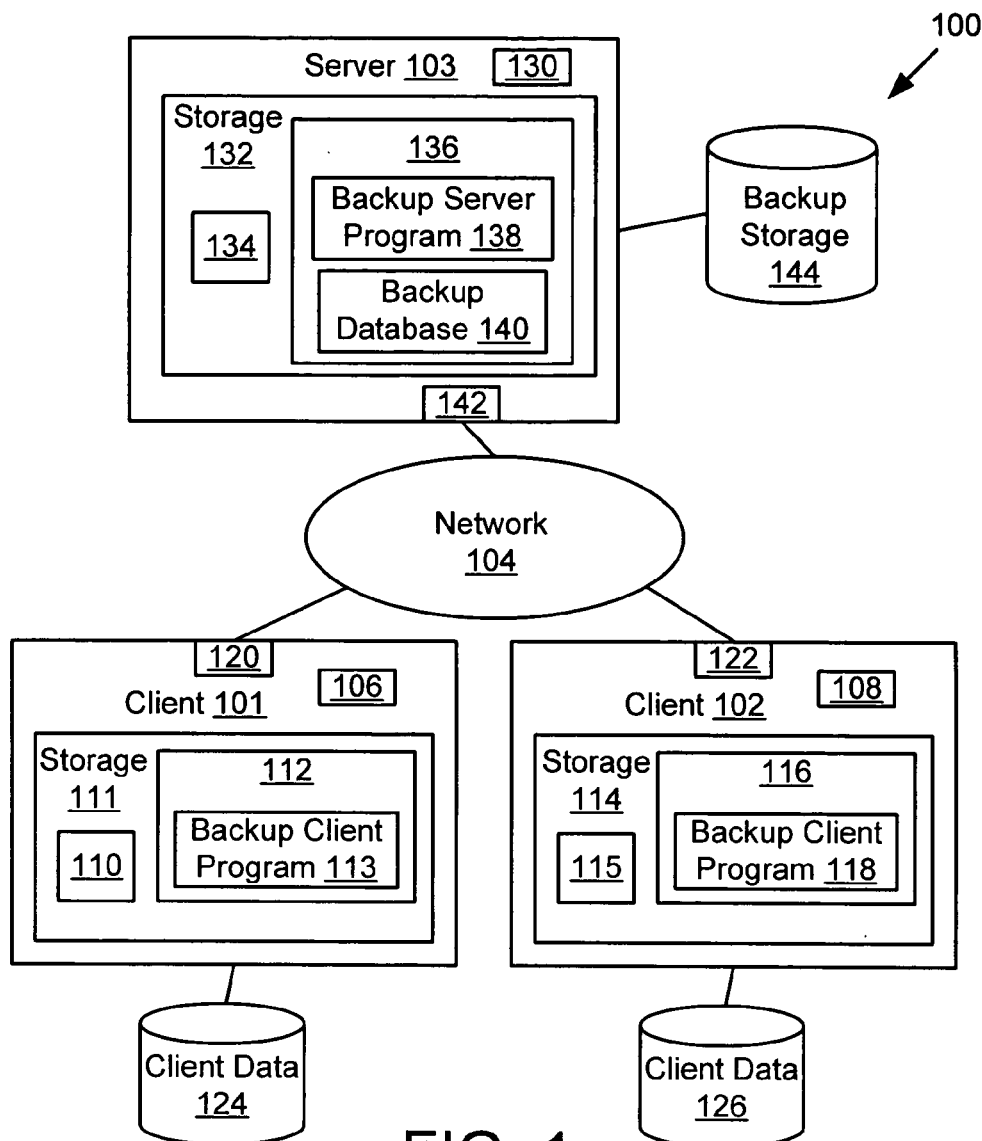
FIG. 1 is a block diagram of the hardware components and interconnections of a computing system in accordance with an example of the invention.

The nature, objectives, and advantages of the invention will become more apparent to those skilled in the art after considering the following detailed description in connection with the accompanying drawings.

I. Hardware Components and Interconnections

One aspect of the invention is a computing system that can be used for ensuring consistency of a group of objects (which may be data objects). As an example, the computing system may be embodied by all, or portions of, the computing system 100 shown in FIG. 1. However, examples of the invention could be implemented on computing systems having different components than the computing system 100. The computing system 100 includes a first client computer 101, a second client computer 102, a server computer 103 (which may be called a backup storage server), and a network 104. Alternatively, only one client could be included, or additional clients could be included. The network 104 may comprise any suitable type of network, for example, the Internet, an Intranet, a Storage Area Network (SAN), a Local Area Network (LAN), and/or a Wide Area Network (WAN), and may include wireless networks, and generally may use any network protocol known in the art. In some examples, Ethernet, ESCON (Enterprise Systems CONnnector), or FICON (FIber CONnector) network protocols could be utilized.

Each client 101, 102 may run any suitable operating system, for example, Windows 2000, AIX, Solaris™, Linux, UNIX, or HP-UX™. Each client 101, 102 may be implemented on any suitable computing device, for example a personal computer, a workstation, a mainframe computer, or a supercomputer. Client 101 has a processor 106 (which may be called a processing device), and in some examples could have more than one processor. Similarly, client 102 has a processor 108. As an example, one or both of the processors 106, 108, may be a PowerPC RISC processor, available from International Business Machines Corporation, or a processor manufactured by Intel Corporation. Client 101 also may have a storage 111 that may include a primary memory 110 (for example RAM), and/or a non-volatile memory 112, both of which are coupled to the processor 106. The storage 111 may also include a backup client program 113, which may be stored in primary memory 110 and/or non-volatile memory 112. Similarly, client 102 may have a storage 114 that may include a primary memory 115 (for example RAM) and/or a non-volatile memory 116, both of which are coupled to the processor 108. The storage 114 may also include a backup client program 118, which may be stored in primary memory 115 and/or non-volatile memory 116. The storage 111, 114 associated with each client 101, 102 may be used to store data and application programs and/or other programming instructions executed by the respective processors 106, 108. The application programs could generally be any suitable applications. The non-volatile memory 112, 116 could be, for example, a hard disk drive, a drive for reading and writing from optical or magneto-optical media, a tape drive, non-volatile RAM (NVRAM), or any other suitable type of storage. Client 101 may also include a network interface 120, and client 102 may also include a network interface 122.

The backup client programs 113, 118 execute on the respective clients 101, 102, and have the capability of transmitting objects to be backed up to the server 103 via the network 104. Client data storage 124 is coupled to client 101, and client data storage 126 is coupled to client 102. The clients 101, 102 may access client data stored in the respective client data storage 124, 126, including objects that the clients 101, 102 may transmit to the server 103 for backup. Each client data storage 124, 126 could be, for example, a hard disk drive, a drive for reading and writing from optical or magneto-optical media, a tape drive, non-volatile RAM (NVRAM), or any other suitable type of storage. Alternatively, the client data could be stored in the non-volatile memories 112, 116, and if so, the client data storage 124, 126 need not be included.

The server 103 will now be discussed further. As an example, the server 103 could be a personal computer (having for example, an Intel processor running the Windows or Linux operating system), a computer workstation, a mainframe computer, a supercomputer (for example an IBM SP2 running the AIX operating system), or any other suitable computing device running any suitable operating system. As another example, the server 103 could be an IBM xSeries server. In another example, the server 103 could be an IBM zSeries Parallel Sysplex server, such as a zSeries 900, running the z Operating System (z/OS). In another example, the server 103 could be an IBM S/390 server running OS/390. The server 103 has a processor 130 (which may be called a processing device), and in some examples could have more than one processor. As an example, the processor 130, may be a PowerPC RISC processor, available from International Business Machines Corporation. In another example, the processor 130 could be a processor manufactured by Intel Corporation. In one specific example, the server 103 could use an IBM P690 power 4 processor, running the AIX operating system and Tivoli Storage Manager (TSM), all of which are available from IBM Corporation. The server may also have a storage 132, which may include a primary memory 134 (for example RAM), and/or a non-volatile memory 136, both of which are coupled to the processor 130. The storage 132 may be used to store data and application programs and/or other programming instructions executed by the processor 130. The programs could generally be any suitable programs, and could include for example, DB2, Oracle, or custom applications. The non-volatile memory 136 could be, for example, a hard disk drive, a drive for reading and writing from optical or magneto-optical media, a tape drive, non-volatile RAM (NVRAM), or any other suitable type of storage. The server 103 may also include a network interface 142.

The storage 132 may also include a backup server program 138 and a backup database 140, which may be stored in primary memory 134 and/or non-volatile memory 136. The backup server program 138 executes on the server and has the capability to perform backup operations, including receiving and storing objects transmitted from the clients 101, 102, via the network 104. Backup data storage 144 is coupled to the server 103, and the server may store objects received from the clients 101, 102 on the backup data storage device. The backup storage 144 could include, for example, one or more of the following: a hard disk drive, any suitable type of Direct Access Storage Device (DASD), a Redundant Array of Independent Disks (RAID), a tape drive, a drive for reading and writing from optical or magneto-optical media, non-volatile RAM (NVRAM), or any other suitable type of storage. As an example, the backup data storage 144 could comprise disk storage implemented with an IBM FAStT 900, and/or a tape library implemented with an IBM 3494 tape library using IBM 3590 drives, all of which are available from IBM Corporation. In another example, the backup storage 144 could be implemented with a model 2105 Enterprise Storage Server, available from IBM Corporation. The backup storage 144 may be may be coupled to the server 103 using, for example, Fibre Channel or SCSI protocol. Similarly, the client data storage 124, 126 could be implemented with any of the devices discussed above with regard to the backup storage 144, and similarly could be coupled to the respective clients 101, 102 using, for example, Fibre Channel or SCSI protocol.

As part of the process of storing backup objects received from the backup client programs 113, 118 to the backup storage 144, the backup server program 138 may store records that provide searchable and indexable information regarding backed-up objects, in the backup database 140. The backup database 140 may be implemented with any suitable database architecture, and could be, for example, a relational database, an object oriented database, or a table. If the backup objects are associated with a group, then an indication of the associated group may be included with the object information stored in the backup database 140.

II. Operation

In addition to the hardware embodiments described above, other aspects of the invention concern a method for ensuring consistency of a group of data objects.

A. Signal-Bearing Media

In the context of FIG. 1, the method aspects of the invention may be implemented, for example, by having one or more of the clients 101, 102, and in some examples, also the server 103, execute a sequence of machine-readable instructions, which can also be referred to as code. These instructions may reside in various types of signal-bearing media. In this respect, some aspects of the present invention concern a programmed product, comprising a signal-bearing medium or signal-bearing media tangibly embodying a program of machine-readable instructions executable by a digital processing apparatus to perform a method for ensuring consistency of a group of data objects.

Figure 2:
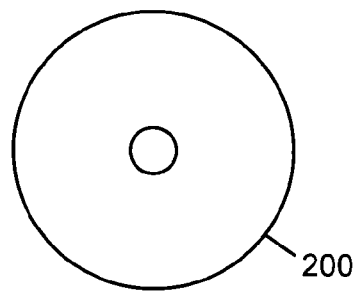
FIG. 2 is an example of a signal-bearing medium in accordance with an example of the invention.

This signal-bearing medium may comprise, for example, primary memory 110 and/or non-volatile memory 112, primary memory 115 and/or non-volatile memory 116, and in some examples, may also comprise primary memory 134 and/or non-volatile memory 136. Alternatively, the instructions may be embodied in a signal-bearing medium such as the optical data storage disc 200 shown in FIG. 2. The optical disc can be any type of signal bearing disc or disk, for example, a CD-ROM, CD-R, CD-RW, WORM, DVD-R, DVD+R, DVD-RW, or DVD+RW. Additionally, whether contained in the computing system 100, or elsewhere, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, programmable logic, any other type of firmware, magneto-optical storage, paper punch cards, or any other suitable signal-bearing media including transmission media such as digital and/or analog communications links, which may be electrical, optical, and/or wireless. For example, in some embodiments the instructions or code may be accessible from a file server over a network, or from other transmission media, and the signal bearing media embodying the instructions or code may comprise a transmission media, such as a network transmission line, wireless transmission media, signals propagating through space, radio waves, and/or infrared signals. Additionally, the signal bearing media may be implemented in hardware logic, for example, an integrated circuit chip, a Programmable Gate Array (PGA), an Application Specific Integrated Circuit (ASIC). As an example, the machine-readable instructions may comprise software object code, compiled from a language such as "C++".

B. Overall Sequence of Operation

For ease of explanation, but without any intended limitation, the method aspects of the invention are described with reference to the computing system 100 described above and shown in FIG. 1.

Figure 3A:
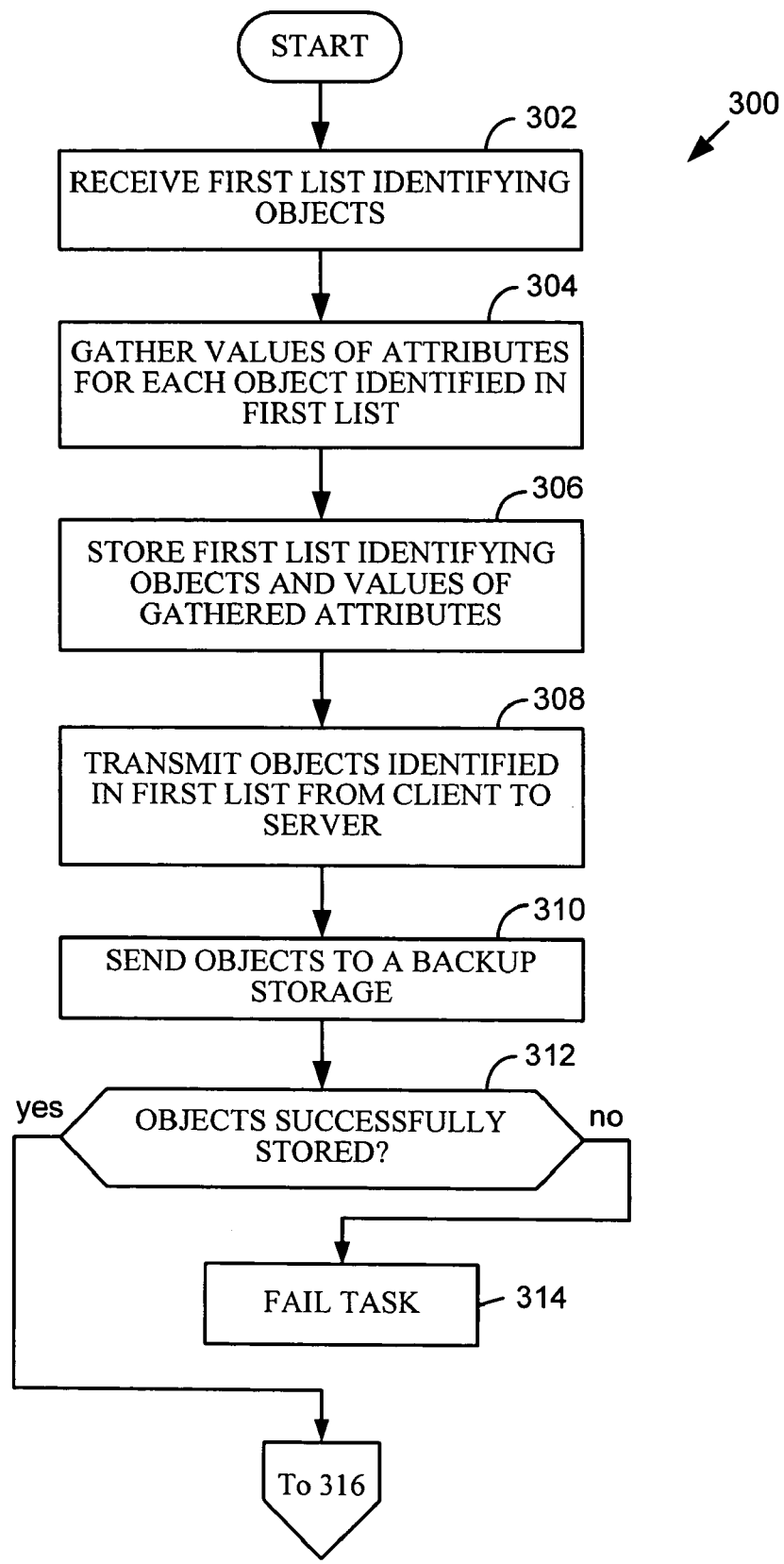

An example of the method aspect of the present invention is illustrated in FIGS. 3A–3B, which show a sequence 300 for a method for ensuring consistency of a group (for example, a group of data objects). In some examples, the group may be a "cross transaction object group". "Cross transaction object grouping" is a grouping mechanism by which a client can define and manipulate multiple separate objects as one logical entity (called a logical object group), and by which a storage management server can recognize the logical group relationship between separate objects so the separate objects can be treated as a unit for server processes, such as expiration. Cross transaction object grouping may be implemented by designating a single object within a group as the "leader", and allowing the properties of the leader to determine the treatment of other members of the group. Cross transaction object grouping is described in U.S. patent application Ser. No. 10/120,015, filed Apr. 10, 2002, titled "Method, system, and program for grouping objects", which is incorporated herein by reference.

In some examples discussed herein, the objects are described as files. However, objects, which also may be called elements or items, more generally may include files in a filesystem and/or volumes of formatted data or unformatted raw data. For example, one or more objects could be raw volumes, in which non structured data, (a stream of bytes with separators) is stored. In another example, one or more objects could be volumes in which database table space is stored. In other examples one or more objects could be flat files (which are used to store a database table on a filesystem, for keeping track of table spaces (storage areas) in a data base). In some examples objects could include bytes in RAM. Generally, an object can be any type of data or information in any form.

In some examples of the invention used for backing up objects, a list of file objects is used to determine which files to back up. One of two general techniques may be used to obtain the list of files. In a first example (called case 1), the list is pregenerated, which means that the list explicitly indicates that, for example, file1, file2, file3, filea, fileb, and filec, are the members of the logical group. In a second example (called case 2), a program scans one or more directories, and may also scan one or more subdirectories, and dynamically creates a list of files that includes all of the files in the scanned directory(s) and subdirectory(s). The directories and subdirectories may be specified. The concept of scanning to create a list is valid for one, or many directories.

A group is inconsistent at a time t2 in comparison to the group at an earlier time t1 if a file in the group has been deleted between time t1 and time t2, and for the case where the list of files is dynamically generated, if a file is added to the group (the list of files at t2) between time t1 and time t2. A group is also inconsistent at a time t2 in comparison to the group at time t1 if any attribute of any of the files in the group has changed between time t1 and time t2. As an example, attributes may include one or more of the following: timestamp (which may be used by an operating system and/or filesystem to note when a file is changed), size, owner (which may be a user), and security permissions. The files may also have other types of attributes. Some examples of the invention may be described as a method for maintaining consistency over a group of files over a window of time when the backup of a first file in the group begins, until backup of the last file is completed. Because the invention may be used to ensure data consistency in a group, it is unnecessary to use an application, such as a database application, to ensure data consistency.

For the first case where the list of files is pregenerated, the list of files will not be changed in a time period between times t1 and t2, so there is no need to check for members being added, but the files should be checked to determine if any files have been deleted, and additionally, the files should be checked to determine if any files have been changed between times t1 and t2. In the second case, where the lists at times t1 and t2 are dynamically created, the lists should also be compared to determine if any files have been added, (in addition to checking to determine if any files have been deleted or changed), between times t1 and t2, to identify instances where a person or another program has put or removed files in the specified directories, thereby corrupting the logical group. In an alternative example, t1 and t2 could designate different locations rather than different times.

The sequence 300 could be performed by client 101 and/or client 102, and in some examples may also be performed by server 103. In some examples the invention may be implemented as software that resides on one or more clients 101, 102, and in some examples the software may also reside on server 103. If more than one client is included, then one client may be designated to coordinate information from all of the clients. Referring to FIG. 3A, the sequence 300 may include, and begin with, operation 302, which comprises receiving a first list that identifies objects in the group. As an example, a pregenerated list may be received by the client 101 or the client 102. In embodiments where the first list is dynamically generated, the operation 302 of receiving a first list that identifies objects in the group comprises generating the first list. Generating the first list may comprise scanning, on one or more clients, at least one directory, at least one directory and at least one subdirectory, all or a subset of the directories in a filesystem, and/or may comprise scanning at least one directory on each of a plurality of clients.

The sequence 300 may also include operation 304, which comprises gathering, for at least one attribute, the value of the attribute for each object identified in the first list. The sequence 300 may also include operation 306, which comprises storing the first list that identifies objects, and the attribute values gathered in the gathering operation, to create a first snapshot of the first list that identifies objects and the gathered attribute values. As an example, the first list that identifies objects, and the attribute values gathered in the gathering operation may be stored in the storage 111 in client 101, and/or in the storage 114 in the client 102. The time t1 may be defined as the time that the first list that identifies objects, and the attribute values gathered in the gathering operation, are stored.

Sequence 300 may also include waiting for at least part of a task to be performed. Alternatively, the sequence 300 may include performing at least part of the task. For example, the task may comprise backing up the objects in the group (which may be described as backing up the objects identified in the first list), performing an installation (for example, of hardware, firmware, or software in the computing system 100), performing a query, or any other task. If the task comprises backing up the objects identified in the first list, performing at least part of the task may comprise transmitting the objects identified in the first list from at least one client 101, 102 to the server 103, as indicated in operation 308. Performing at least part of the task may further comprise sending the objects identified in the first list to a backup storage 144, as indicated in operation 310. Performing at least part of the task may also comprise determining if all of the objects identified in the first list have been successfully stored on the backup storage 144, as indicated in operation 312, and if not, failing the task of backing up the objects in the group in operation 314. The operation 314 of failing the task may comprise rolling back at least one commit by the server 103 (for example, the commit of the storage of one or more of the objects).

Referring to FIG. 3B, sequence 300 may also include operation 316, which comprises receiving, a second list that identifies objects that are in the group after at least part of the task is performed, and operation 318 which comprises receiving (which may comprise gathering), the value after at least part of the task is performed, of the at least one attribute for each object identified in the second list. In an alternative example, the operation 316 of receiving the second list that identifies objects in the group after at least part of the task is performed, comprises generating the second list. Generating the second list may comprise scanning, on one or more clients, at least one directory, at least one directory and at least one subdirectory, all or a subset of the directories in a filesystem, and/or may comprise scanning at least one directory on each of a plurality of clients.

Sequence 300 may also include operation 320, which comprises storing the second list that identifies objects, and the received attribute values, to create a second snapshot of the second list that identifies objects and the received attribute values. The time t2 may be defined as the time the second list that identifies objects, and the received attribute values, are stored. The first snapshot corresponds with a time t1, and the second snapshot corresponds with a time t2, wherein t1 is before t2. The period of time between t1 and t2 may be a set period of time, or may be a period of time that is not prespecified. At time t2 the server 103 will have committed all of the objects to the backup storage 144 (but will not yet have committed the backup operation as a whole). In other words, two stages of commit are used. First, a commit is done for each element individually or for multiple elements in a transaction (when the elements are backed up from the client to the server), and later, a commit is done for the entire group (if no error condition exists, namely, if the members in the group and the values of the attributes of the members of the group have not changed between t1 and t2).

Sequence 300 may also include comparing the first snapshot with the second snapshot, and may also include failing the task if the first snapshot and the second snapshot are not the same. Comparing the first and second snapshots may comprise determining if all of the objects identified in the first list are identified in the second list, and may also comprise determining if all of the objects identified in the second list are identified in the first list, as indicated in operation 322. Comparing the first and second snapshots may alternatively be described as comprising determining if the first and second lists identify the same objects. If in operation 322 it is determined that all of the objects identified in the first list are not identified in the second list, or that all of the objects identified in the second list are not identified in the first list, then the sequence 300 may include failing the task as indicated in operation 324 (which in some examples may comprise rolling back one or more commits).

If in operation 322 it is determined that all of the objects identified in the first list are identified in the second list, and that all of the objects identified in the second list are identified in the first list, then the sequence 300 may include operation 326, which comprises determining if the value of the at least one attribute for each object identified in the first list is the same as the value of the at least one attribute for the same object identified in the second list. If in operation 326 it is determined that the value of the at least one attribute for each object identified in the first list is not the same as the value of the at least one attribute for the same object identified in the second list, then the sequence 300 may include operation 328, which comprises failing the task (which in some examples may comprise rolling back one or more commits). In the case of multiple attributes, the task will be failed unless all attributes for a given object are the same. If in operation 326 it is determined that the value of the at least one attribute for each object identified in the first list is the same as the value of the at least one attribute for the same object identified in the second list, then the sequence 300 may include operation 330, which comprises committing the task. Thus, some examples of the invention provide for ensuring consistency of a logical group over a period of time between the time the members of the group are defined and the time the group is committed to the server.

In summary, some aspects of the invention may be described as a method for providing 100% logical group consistency over a time period. In some examples the time period is the time it takes to back up a list of objects that comprise a logical group. A snapshot is taken of the group at time t1. After all the objects have been backed up, another snapshot of the group is taken at time t2. Taking the snapshot at time t2 involves performing a re-scan of the files in the group. If the two snapshots are identical, then the logical group has not changed and the backup is valid. If the two snapshots are not the same, then something was added, deleted, or changed and the backup of the logical group is invalid.

Some examples of the invention may be summarized as follows: First, a list of files is put in memory and values of the attributes for each file are saved. The saved list of files and values of the attributes comprise the first snapshot of the group at the beginning of processing at time t1.

Next, the files in the list of files are backed up. In some instances one or more files might be added to a group during backup processing. Adding a file will only constitute an error condition for cases where the logical group is dynamically created. Adding a file does not constitute an error for the case where the list of files is pregenerated, because any file added will be ignored during the backup processing because the list of files to be backed up will not be changed between time t1 and time t2. In some instances one or more files in a group might be deleted before or after the deleted file is processed for a backup. For example, during the time that a file1 is being backed up, a file2 might be deleted. This is an error condition that would be detected for both the case where the list of files is pregenerated, and for the case where the list of files is dynamically generated, because the deleted file2 would not be found to be backed up. In another example, if file1 is deleted after it is backed up but before all of the files in the group have been backed up, this would also constitute an error condition for both the case where the list of files is pregenerated, and for the case where the list of files is dynamically generated, and would be detected when the snapshot at time t1 is compared to the snapshot at time t2 after the backup has completed for all the files in the group. Another type of error that will exist for both the case where the list of files is pregenerated, and for the case where the list of files is dynamically generated, is when a file in a group is changed after attributes of the files are scanned for the snapshot at time t1. This error would also be also be detected when the snapshot at time t1 is compared to the snapshot at time t2 after the backup has been completed for all the files in the group.

Continuing the discussion of this example, after the backup processing is completed, a second snapshot of the logical group is taken. For the case where the list of files is pregenerated, the same list of files is used is used for the snapshot at time t2 as is used for the snapshot at time t1, and the same files attributes are rescanned. For the case where the list of files is dynamically generated, after the backup processing is completed, the dynamic file list is regenerated, and the newly generated list is put in memory and the attributes of the files in the generated list are rescanned.

At this point there are two snapshots which consist of two lists of files, one from the beginning of processing at time t1, and one from after the files have been backed up at time t2. The first snapshot also includes the values of the attributes of the files time t1, and the second snapshot also includes the values of the attributes of the files at time t2. In the case where the list of files is pregenerated, the two lists will be the same with respect to the file names. The lists of files and the values of the attributes in the two snapshots are compared against one another. If a file has been removed or changed during backup processing, and for the case where the list of files is dynamically generated also if a file has been added during backup processing, then the logical group has been corrupted and the backup is bad and the logical group is not committed. If the two snapshots are the same, then the logical group has not changed, the back up is good and can be committed.

In the preceding example, files are used as examples of the objects in the group. However, the invention may also be used with non-file objects. Also, in the preceding example, the time period that elapses between time t1 and time t2 is the time required to backup the files in the group. However, in other examples the time period could be, for example, the time required to install something, the time required to perform a query, or the time required to perform any other operation that opens a window of time where a group could be corrupted.

A specific example of a file backup implementation of the invention will now be discussed. In this example, the files in dir1 and dir2 comprise the members of the logical group. Also, in this example, files file1, file2, and file3 are in dir1, and files filea, fileb. and filec are in dir2. On a file system, the group would look like:

/dir1
file1
file2
file3
/dir2
filea
fileb
filec

An error condition where a file as changed before the backup is complete can be depicted as follows:

/dir1
file1~(File changed)
file2
file3
/dir2
filea fileb
filec

In this case, when the two snapshots are compared, the attributes for file1 at t1 and file1 at t2 are different. This would be an error condition for both the case where the list of files is pregenerated, and the case where the list of files is dynamically generated.

The situation where a file as been added before the backup is complete can be depicted as follows:
/dir1
file1
file2
file3
file4 (New file added)
/dir2
filea
fileb
filec This would be an error condition only for the case where the list of files is dynamically generated.

An error condition where a file has been removed before the backup is complete can be depicted as follows:
at t2:
/dir1
file1
file2
file3
/dir2
filea
filec
fileb (Has been removed)

If fileb is removed before fileb is backed up, the backup will fail for both the case where the list of files is pregenerated, and for the case where the list of files is dynamically generated, because fileb will not be able to be located to be backed up. An error condition will also exist for both cases if fileb is removed after fileb is backed up but before the values of the attributes of the files are scanned at time t2, and an error condition will also exist for the case where the list of files is dynamically generated if fileb is removed before the list of files is generated for the snapshot at time t2.

III. Other Embodiments

While the foregoing disclosure shows a number of illustrative embodiments of the invention, it will be apparent to those skilled in the art that various changes and modifications can be made herein without departing from the scope of the invention as defined by the appended claims. For example, although a client-sever environment is described above, in alternative embodiments, examples of the invention could be implemented on a standalone computing system that is not within a client-server environment. In those examples, the operations discussed above could be performed on the stand alone computing system. Additionally, although elements of the invention may be described or claimed in the singular, the plural is contemplated unless limitation to the singular is explicitly stated.

What is claimed is:

1. A storage medium tangibly embodying a program of machine-readable instructions executable by a digital processing apparatus to perform a method for ensuring consistency of a group, the method comprising the following operations:

receiving a first list, wherein the first list identifies a first group of objects;

for each object identified in the first group, gathering a value of an attribute corresponding with the object, so each gathered attribute value is associated with a corresponding object identified in the first group;

storing, at a time $t_1$, the first list that identifies the first group of objects, and the value of the attribute corresponding with each object in the first group of objects, to create a first snapshot of the first list that identifies the first group of objects and the attribute value corresponding with each object in the first group of objects;

after at least part of a task is performed, receiving a second list, wherein the second list identifies a second group of objects, and receiving, for each object identified in the second group, a value of the attribute corresponding with the object, so each received attribute value is associated with a corresponding object identified in the second group;

storing, at a time $t_2$, the second list that identifies the second group of objects, and the value of the attribute corresponding with each object in the second group of objects, to create a second snapshot of the second list that identifies the second group of objects and the attribute value corresponding with each object in the second group of objects; and comparing the first snapshot with the second snapshot.

2. The storage medium of claim 1, wherein the operations further comprise failing the task if the first snapshot and the second snapshot are not the same.

3. The storage medium of claim 2, wherein the comparing and failing operations comprise:

determining if all of the objects identified in the first list are identified in the second list and if all of the objects identified in the second list are identified in the first list;
and if not, failing the task;
and if so, for each object identified in the first list, determining if the value of the attribute corresponding with the object is the same as the value of the attribute corresponding with the same object identified in the second list,
and if not, failing the task;
and if so, committing the task.

4. The storage medium of claim 1, wherein the attribute is a timestamp.

5. The storage medium of claim 1, wherein the task comprises backing up the objects identified in the first list.

6. The storage medium of claim 5, wherein the operation of performing at least part of the task comprises transmitting the objects identified in the first list from at least one client to a backup storage server.

7. The storage medium of claim 6, wherein the operation of performing at least part of the task further comprises:

determining if all of the objects identified in the first list have been successfully stored on a backup storage,
and if not, failing the task of backing up the objects identified in the first list.

8. The storage medium of claim 7, wherein the operation of failing the task comprises rolling back at least one commit by the server.

9. The storage medium of claim 1, wherein the attribute is size.

10. The storage medium of claim 1, wherein the task comprises performing an installation.

11. The storage medium of claim 1, wherein the task comprises performing a query.

12. The storage medium of claim 1, wherein the first group is a Cross Transaction Logical Object Group.

13. The storage medium of claim 1, wherein t1 is before t2.

14. The storage medium of claim 1, wherein the operation of receiving a first list comprises generating the first list.

15. The storage medium of claim 14, wherein generating the first list comprises scanning a subset of a filesystem's directories.

16. The storage medium of claim 14, wherein generating the first list comprises scanning at least one directory on each of a plurality of clients.

17. The storage medium of claim 14, wherein the operation of receiving a second list comprises generating the second list.

18. The storage medium of claim 17, wherein generating the second list comprises scanning a subset of a filesystem's directories.

19. The storage medium of claim 17,
wherein the operations further comprise failing the task if the first snapshot and the second snapshot are not the same; and
wherein the comparing and failing operations comprise:
determining if the first list and the second list identify the same objects;
and if not, failing the task;
and if so, for each object identified in the first list, determining if the value of the attribute corresponding with the object is the same as the value of the attribute corresponding with the same object identified in the second list,
and if not, failing the task;
and if so, committing the task.

20. A storage medium tangibly embodying a program of machine-readable instructions executable by a digital processing apparatus to perform a method for ensuring consistency of a logical group, the method comprising the following operations:
generating a first list, wherein the first list identifies a first group of objects;
for each object identified in the first group, gathering the value of a timestamp corresponding with the object, so each gathered timestamp value is associated with a corresponding object identified in the first group;
storing, at a time $t_1$, the first list that identifies the first group of objects, and the value of the timestamp corresponding with each object in the first group of objects, to create a first snapshot of the first list that identifies the first group of objects and the timestamp value corresponding with each object in the first group of objects;
waiting for at least part of a task of backing up the objects in the first group to be performed;
after at least part of the task is performed, generating, a second list, wherein the second list identifies a second group of objects, and receiving, for each object identified in the second group, a value of a timestamp corresponding with the object, so each received attribute value is associated with a corresponding object identified in the second group;
storing, at a time $t_2$, the second list that identifies the second group of objects, and the value of the timestamp corresponding with each object in the second group of objects, to create a second snapshot of the second list that identifies the second group of objects and the timestamp value corresponding with each object in the second group of objects;

determining if the first list identifies the same objects as the second list;
and if not, failing the task;
and if so, for each object identified in the first list, determining if the value of the timestamp corresponding with the object is the same as the value of the timestamp corresponding with the same object identified in the second list,
and if not, failing the task;
and if so, committing the task.

21. A computing system, comprising:
a memory; and
a processing device coupled to the memory, wherein the processing device is programmed to perform operations for ensuring consistency of a group, the operations comprising:
receiving a first list, wherein the first list identifies a first group of objects;
for each object identified in the first group, gathering a value of an attribute corresponding with the object, so each gathered attribute value is associated with a corresponding object identified in the first group;
storing, at a time $t_1$, the first list that identifies the first group of objects, and the value of the attribute corresponding with each object in the first group of objects, to create a first snapshot of the first list that identifies the first group of objects and the attribute value corresponding with each object in the first group of objects;
after at least part of a task is performed, receiving a second list, wherein the second list identifies a second group of objects, and receiving, for each object identified in the second group, a value of the attribute corresponding with the object, so each received attribute value is associated with a corresponding object identified in the second group;
storing, at a time $t_2$, the second list that identifies the second group of objects, and the value of the attribute corresponding with each object in the second group of objects, to create a second snapshot of the second list that identifies the second group of objects and the attribute value corresponding with each object in the second group of objects; and
comparing the first snapshot with the second snapshot.

22. The computing system of claim 21, wherein the operations further comprise failing the task if the first snapshot and the second snapshot are not the same.

23. The computing system of claim 22, wherein the comparing and failing operations comprise:
determining if all of the objects identified in the first list are identified in the second list and if all of the objects identified in the second list are identified in the first list;
and if not, failing the task;
and if so, for each object identified in the first list, determining if the value of the attribute corresponding with the object is the same as the value of the attribute corresponding with the same object identified in the second list,
and if not, failing the task;
and if so, committing the task.

24. The computing system of claim 21, wherein the attribute is a timestamp.

25. The computing system of claim 24, wherein the operation of receiving a first list that identifies objects in the first group comprises generating the first list, and the operation of receiving a second list that identifies objects in the second group after at least part of the task is performed comprises generating the second list.

26. A computing system, comprising:
- means for receiving a first list, wherein the first list identifies a first group of objects;
- means for, for each object identified in the first group, gathering a value of an attribute corresponding with the object, so each gathered attribute value is associated with a corresponding object identified in the first group;
- means for storing, at a time $t_1$, the first list that identifies the first group of objects, and the value of the attribute corresponding with each object in the first group of objects, to create a first snapshot of the first list that identifies the first group of objects and the attribute value corresponding with each object in the first group of objects;
- after at least part of a task is performed, means for receiving, a second list, wherein the second list identifies a second group of objects, and receiving, for each object identified in the second group, a value of the attribute corresponding with the object, so each received attribute value is associated with a corresponding object identified in the second group;
- means for storing, at a time $t_2$, the second list that identifies the second group of objects, and the value of the attribute corresponding with each object in the second group of objects, to create a second snapshot of the second list that identifies the second group of objects and the attribute value corresponding with each object in the second group of objects; and
- means for comparing the first snapshot with the second snapshot.

27. A method for ensuring consistency of a group, comprising the following operations:
- receiving a first list, wherein the first list identifies a first group of objects;
- for each object identified in the first group, gathering a value of an attribute corresponding with the object, so each gathered attribute value is associated with a corresponding object identified in the first group;
- storing, at a time $t_1$, the first list that identifies the first group of objects, and the value of the attribute corresponding with each object in the first group of objects, to create a first snapshot of the first list that identifies the first group of objects and the attribute value corresponding with each object in the first group of objects;
- after at least part of a task is performed, receiving a second list, wherein the second list identifies a second group of objects, and receiving, for each object identified in the second group, a value of the attribute corresponding with the object, so each received attribute value is associated with a corresponding object identified in the second group;
- storing, at a time $t_2$, the second list that identifies the second group of objects, and the value of the attribute corresponding with each object in the second group of objects, to create a second snapshot of the second list that identifies the second group of objects and the attribute value corresponding with each object in the second group of objects; and
- comparing the first snapshot with the second snapshot.

28. The method of claim 27, wherein the operations further comprise:
- performing at least part of the task; and
- failing the task if the first snapshot and the second snapshot are not the same.

29. The method of claim 28, wherein the comparing and failing operations comprise:
- determining if all of the objects identified in the first list are identified in the second list and if all of the objects identified in the second list are identified in the first list;
  - and if not, failing the task;
  - and if so, for each object identified in the first list, determining if the value of the attribute corresponding with the object is the same as the value of the attribute corresponding with the same object identified in the second list,
    - and if not, failing the task;
    - and if so, committing the task.

30. The method of claim 29:
- wherein the operation of receiving a first list that identifies objects in the first group comprises generating the first list, and the operation of receiving a second list that identifies objects in the second group after at least part of the task is performed comprises generating the second list; and
- wherein the task comprises backing up the objects identified in the first list.

* * * * *